US012659567B2

(12) United States Patent
Borges et al.

(10) Patent No.: US 12,659,567 B2
(45) Date of Patent: Jun. 16, 2026

(54) ADAPTIVE VIDEO STREAMING FRAMES PER SECOND BASED ON APPLIANCE STATUS

(71) Applicant: WHIRLPOOL CORPORATION, Benton Harbor, MI (US)

(72) Inventors: Rodrigo Weissmann Borges, Rio Claro (BR); Bhargav M. Jain, Pune (IN); Blayne Christopher Smith, Saint Joseph, MI (US); Collin Andrew Stipe, West Unity, OH (US); Seth Douglas Herndon, Osceola, IN (US)

(73) Assignee: Whirlpool Corporation, Benton Harbor, MI (US)

( * ) Notice: Subject to any disclaimer, the term of this patent is extended or adjusted under 35 U.S.C. 154(b) by 0 days.

(21) Appl. No.: 18/775,192

(22) Filed: Jul. 17, 2024

(65) Prior Publication Data

US 2026/0025565 A1    Jan. 22, 2026

(51) Int. Cl.
| | |
|---|---|
| *H04N 23/61* | (2023.01) |
| *F24C 15/00* | (2006.01) |
| *G06T 7/70* | (2017.01) |
| *G06V 20/52* | (2022.01) |
| *G06V 20/68* | (2022.01) |
| *H04N 7/18* | (2006.01) |

(52) U.S. Cl.
CPC .......... *H04N 23/61* (2023.01); *F24C 15/008* (2013.01); *G06T 7/70* (2017.01); *G06V 20/52* (2022.01); *G06V 20/68* (2022.01); *H04N 7/183* (2013.01); *G06T 2207/30232* (2013.01)

(58) Field of Classification Search
None
See application file for complete search history.

(56) References Cited

U.S. PATENT DOCUMENTS

| | | | |
|---|---|---|---|
| 9,920,982 B2 | 3/2018 | Kim et al. | |
| 11,425,338 B2 | 8/2022 | Kang et al. | |
| 2018/0292092 A1* | 10/2018 | Bhogal | F24C 7/085 |
| 2019/0114941 A1* | 4/2019 | Shimaoka | G09B 19/0092 |
| 2019/0234617 A1* | 8/2019 | Bhogal | F24C 3/124 |
| 2021/0131011 A1* | 5/2021 | Park | D06F 34/20 |
| 2022/0214111 A1* | 7/2022 | Gibson | F27D 1/0033 |
| 2022/0311927 A1 | 9/2022 | Ka et al. | |
| 2022/0392081 A1* | 12/2022 | Ryan | G06V 40/20 |
| 2023/0213205 A1 | 7/2023 | Franco Gutierrez et al. | |
| 2023/0216985 A1 | 7/2023 | Tak et al. | |

FOREIGN PATENT DOCUMENTS

| | | |
|---|---|---|
| CN | 111462190 A | 7/2020 |
| DE | 102020206008 A1 | 11/2021 |

* cited by examiner

*Primary Examiner* — Eileen M Adams
(74) *Attorney, Agent, or Firm* — Price Heneveld LLP

(57) ABSTRACT

A cooking appliance includes a body defining a cooking chamber and a door moveable between a closed position and an open position. A camera module is configured to capture images of the cooking chamber. A control system is configured to receive the images from the camera module, monitor the cooking appliance or a foodstuff within the cooking chamber for a presence of a condition, and, if the presence of the condition is detected, generate a signal to modify a frame rate of the camera module.

18 Claims, 7 Drawing Sheets

200

202

RECEIVE IMAGES FROM A CAMERA MODULE OF A COOKING APPLIANCE

204

MONITOR THE COOKING APPLIANCE FOR A PRESENCE OF A CONDITION

206

IF THE PRESENCE OF THE CONDITION OF THE COOKING APPLIANCE IS DETECTED, GENERATE A SIGNAL TO MODIFY A FRAME RATE OF THE CAMERA MODULE

ADAPTIVE VIDEO STREAMING FRAMES PER SECOND BASED ON APPLIANCE STATUS

FIELD OF THE DISCLOSURE

The present disclosure generally relates to a monitoring system for a cooking appliance with adaptive frame rates.

BACKGROUND

Cooking appliances have incorporated systems to visually demonstrate the status of foodstuff within a cooking chamber. Many of these systems utilize video streaming and the video streaming is at a relatively high constant rate of 30 or 60 frames-per-second ("fps"). This constant rate is taxing to the control system, requires a lot of energy, and can result in poor performance. For example, the constant rate can result in the sluggishness of performance, and reduce bandwidth for other algorithms and functionalities of the control system. Further, transmitting full resolution video at 30 fps to, for example, a cloud is costly from a transaction and data storage perspective. If the consumer does not have unlimited data, additional data download fees may be incurred.

Accordingly, the present disclosure relates to a monitoring system for a cooking appliance with adaptive frame rates for cost reduction to the consumer and resource and performance management of the control system.

SUMMARY OF THE DISCLOSURE

According to one aspect of the present disclosure, a cooking appliance includes a body defining a cooking chamber and a door moveable between a closed position and an open position. A camera module is configured to capture images of the cooking chamber. A control system is configured to receive the images from the camera module, monitor the cooking appliance or a foodstuff within the cooking chamber for a presence of a condition, and, if the presence of the condition is detected, generate a signal to modify a frame rate of the camera module.

According to another aspect of the present disclosure, a cooking appliance includes a body defining a cooking chamber and a door moveable between a closed position and an open position. A camera module is configured to capture images of the cooking chamber. A control system is configured to receive the images from the camera module, monitor the cooking appliance for a presence of a condition, and, if the presence of the condition is detected, generate a signal to modify a frame rate of the camera module.

According to yet another aspect of the present disclosure, a cooking appliance includes a body defining a cooking chamber and a door moveable between a closed position and an open position. A camera module is configured to capture images of the cooking chamber. A control system is configured to receive the images from the camera module, monitor a foodstuff within the cooking chamber for a presence of a condition, and, if the presence of the condition is detected, generate a signal to modify a frame rate of the camera module.

These and other features, advantages, and objects of the present disclosure will be further understood and appreciated by those skilled in the art by reference to the following specification, claims, and appended drawings.

Figure 1:
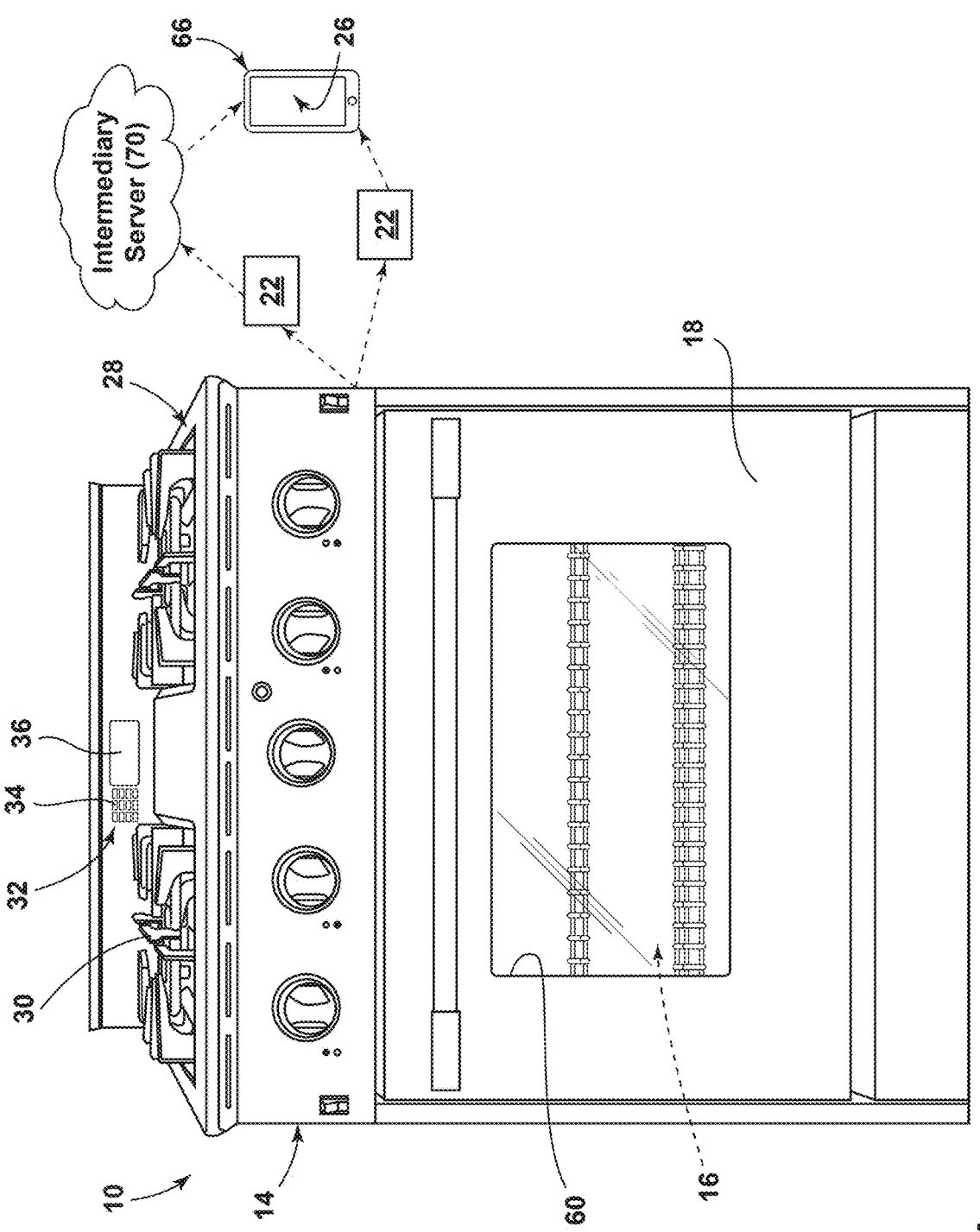
FIG. 1 is a front view of a cooking appliance with a monitoring system and an adaptive frame rate, according to an aspect of the present disclosure.

The components in the figures are not necessarily to scale, emphasis instead being placed upon illustrating the principles described herein.

DETAILED DESCRIPTION

The present illustrated embodiments reside primarily in a monitoring system for a cooking appliance with adaptive frame rates. Accordingly, the apparatus components and method steps have been represented, where appropriate, by conventional symbols in the drawings, showing only those specific details that are pertinent to understanding the embodiments of the present disclosure so as not to obscure the disclosure with details that will be readily apparent to those of ordinary skill in the art having the benefit of the description herein. Further, like numerals in the description and drawings represent like elements.

For purposes of description herein, the terms "upper," "lower," "right," "left," "rear," "front," "vertical," "horizontal," and derivatives thereof shall relate to the disclosure as oriented in FIG. 1. Unless stated otherwise, the term "front" shall refer to the surface of the element closer to an intended viewer and/or user, and the term "rear" shall refer to the surface of the element further from the intended viewer and/or user. However, it is to be understood that the disclosure may assume various alternative orientations, except where expressly specified to the contrary. It is also to be understood that the specific devices and processes illustrated in the attached drawings, and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise.

The terms "including," "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element preceded by "comprises a . . . " does not, without more constraints, preclude the existence of additional identical elements in the process, method, article, or apparatus that comprises the element.

Referring initially to FIGS. 1-5, reference numeral 10 generally designates a cooking appliance with a monitoring system 12 that facilitates an adaptive frame rate. The cooking appliance 10 includes a body 14 defining a cooking chamber 16 and a door 18 moveable between a closed position (FIG. 3A) and an open position (FIG. 3B). A camera module 20 is configured to capture images 22 of the cooking chamber 16. A control system 100 (e.g., a processor 104) is configured to receive the images 22 from the camera module 20, monitor the cooking appliance 10 or a foodstuff 24 within the cooking chamber 16 for a presence of a condition, and, if the presence of the condition is detected, generate a signal to modify a frame rate of the camera module 20.

The modified frame rate may include a decrease in the frames-per-second ("fps") or an increase in the fps based on the condition. More particularly, during operation, the images 22 captured by the camera module 20 may be generated on a display 26. In this manner, a user can visually see the status of the foodstuff 24 within the cooking chamber 16 throughout a cooking cycle or duty cycle. Over the course of the cooking cycle, a higher frame rate may be more beneficial in certain scenarios than in other scenarios. For example, while foodstuff 24 is being cooked, a higher frame rate is oftentimes not as necessary absent the presence of the condition that may relate to one or both of the cooking appliance 10 and the foodstuff 24. In this manner, the control system 100 (e.g., the processor) can determine when to increase or decrease the frame rate in order to preserve energy and processing resources.

Figure 2:
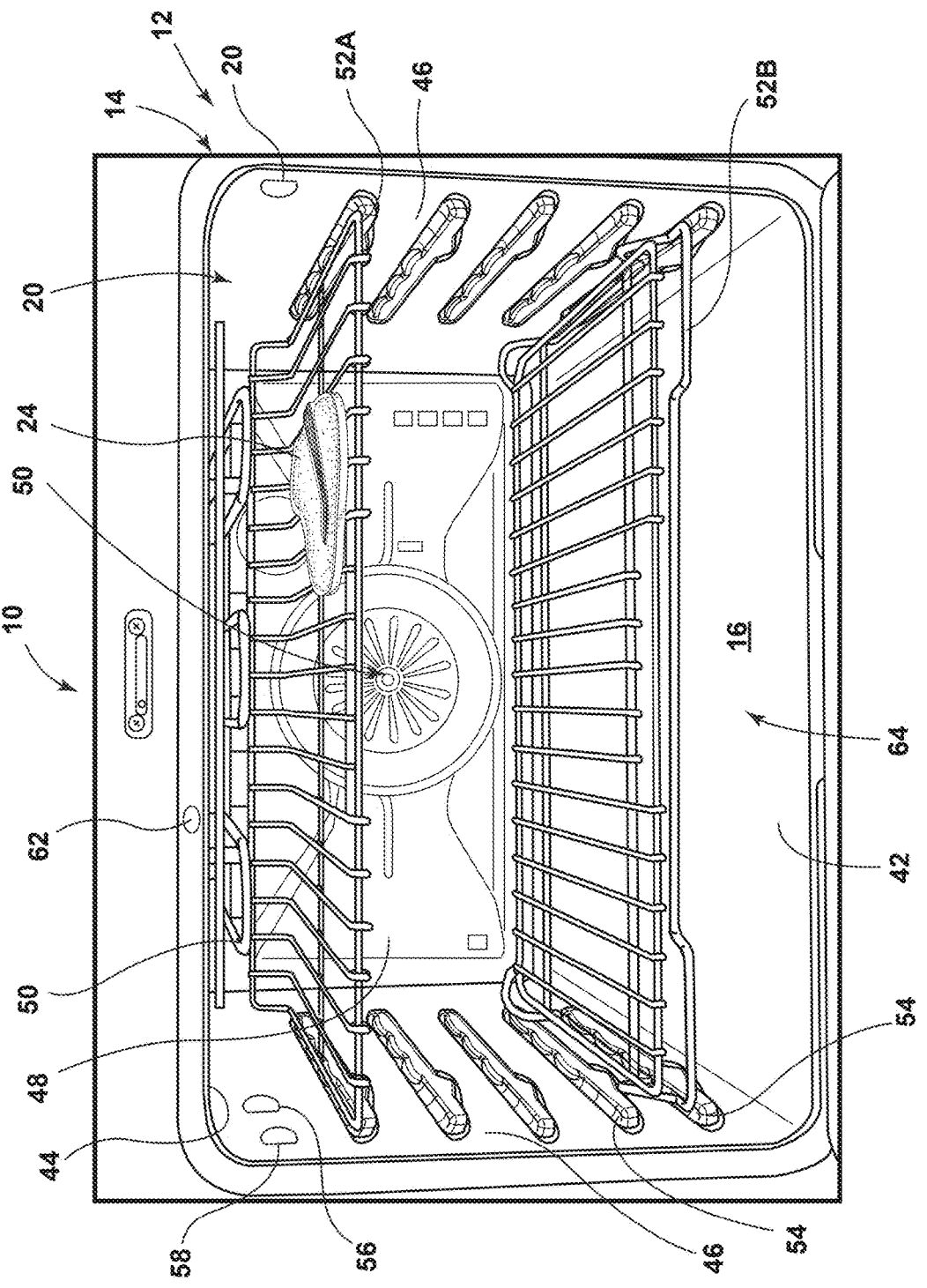
FIG. 2 is a front view of a cooking chamber with a monitoring system and an adaptive frame rate, according to an aspect of the present disclosure.

With reference now to FIGS. 1 and 2, the cooking appliance 10 may employ a variety of heating technologies, such as induction heating, electric heating, gas heating, and heating that employs all fuel types. The cooking appliance 10 may also provide different cooking cycle options, for example, at different temperatures, baking, broiling, convection baking, air circulation, and/or different cooking times. In some embodiments, the cooking appliance 10 may include a cooktop 28 including one or more burners 30 that employ any of the above-referenced heating technologies. The cooking chamber 16 may be accessed via the door 18. The cooking appliance 10 may further include a user interface 32 that includes user inputs 34, such as touchpads, buttons, knobs, speakers, voice recognition functionality, and/or the like. The user interface 32 may further include a user communication device 36, such as a display, a speaker, and/or one or more lighting modules that effectuate alerting and/or notifying the user. In some embodiments, the user interface 32 may further include a communication module 38 that wirelessly connects to a device, such as a mobile phone, a tablet, and/or an intermediary server (e.g., a cloud). In this manner, when an alert or notification is generated, it may be generated locally via the user communication device 36 and/or remotely via communication between the communication module 38 and the device and/or the intermediary server.

With continued reference to FIGS. 1 and 2, the cooking chamber 16 is generally defined by a floor 42 and a ceiling 44 spaced by sidewalls 46 and a back wall 48. One or more heating elements 50 are generally proximate the back wall 48 and/or the ceiling 44. The one or more heating elements 50 may include multiple heating elements 50 corresponding to baking, broiling, convection baking, and/or the like. The cooking appliance 10 typically includes one or more racks 52A, 52B (e.g., a top rack 52A and a bottom rack 52B) for placing the foodstuff 24. The cooking chamber 16 (e.g., the sidewalls 46 and/or back wall 48) may define rack holding structures 54 for locating the one or more racks 52A, 52B at different rack levels relative to a floor 42 and ceiling 44. The rack holding structures 54 may include projections or recesses that hold one of the racks 52A, 52B. Accordingly, camera module 20 may be positioned to capture images 22 of the foodstuff 24 within the cooking chamber 16 and at different rack levels. Therefore, by monitoring the foodstuff 24, the cooking appliance 10 can transmit the images 22 to the display 26 for visual review by a user.

With reference now to FIG. 2, in some embodiments, the camera module 20 may be located within the cooking chamber 16, outside of the cooking chamber 16 and behind one or more of the floor 42, the ceiling 44, the sidewalls 46, and/or the back wall 48 (e.g., and oriented towards the cooking chamber 16 with an exposure hole and/or transparent element), and/or outside of the cooking appliance 10 (e.g., on the door 18). In some embodiments, the monitoring system 12 may implement two or more camera modules 20 within the cooking chamber 16 to ensure line-of-sight from different orientations. In this manner, the size, shape, quantity, status, and the presence of the condition related to the foodstuff 24 can be determined. In some embodiments, the image capturing module 20 may operate in conjunction with an illumination source 56 configured to illuminate (e.g., flood illumination) the cooking chamber 16 within the infrared spectrum. In some embodiments, the control system (e.g., the processor 104) and the image module 20 may be configured to extract depth information, for example, through the principles of stereovision, time-of-flight, or other depth extracting, size determining, methodologies. The cooking chamber 16 may also include a light module 58 that lights the cooking chamber 16 within the visible spectrum so a user can directly inspect the foodstuff 24. For example, the door 18 may include a transparent section 60 (FIG. 1) that permits a user to directly inspect the foodstuff 24 with or without the light module 58 and without opening the door 18.

The monitoring system 12 may further employ one or more sensors 62 in addition to the camera module 20. As used herein, the term "sensor" may refer to one or more of any type of sensing module that is capable of extracting data for the control system 100 (e.g., the processor 104) relating to the condition of the cooking appliance 10. For example, the one or more sensors 62 may be located on one or more of the floor 42, the ceiling 44, the sidewalls 46, the back wall 48, the door 18, or a portion of the body 14 that defines an opening 64 to the cooking chamber 16 that is covered by the door 18 in the closed position. In some embodiments, the one or sensors 62 may be a switch that is actuated based on movement of the door 18, a magnetic sensor that senses when the door 18 is in the open or closed position, a proximity sensor that senses when the door 18 is in the open or closed position, a temperature sensor that measures the temperature internal to the cooking chamber 16, and/or the like. The control system 100 (e.g., the processor 104) may, therefore, be configured to monitor the cooking appliance 10 for the presence of the condition by reviewing the images 22 received by the camera module 20 by receiving a detection from the one or more sensors 62.

Figures 3A, 3B:
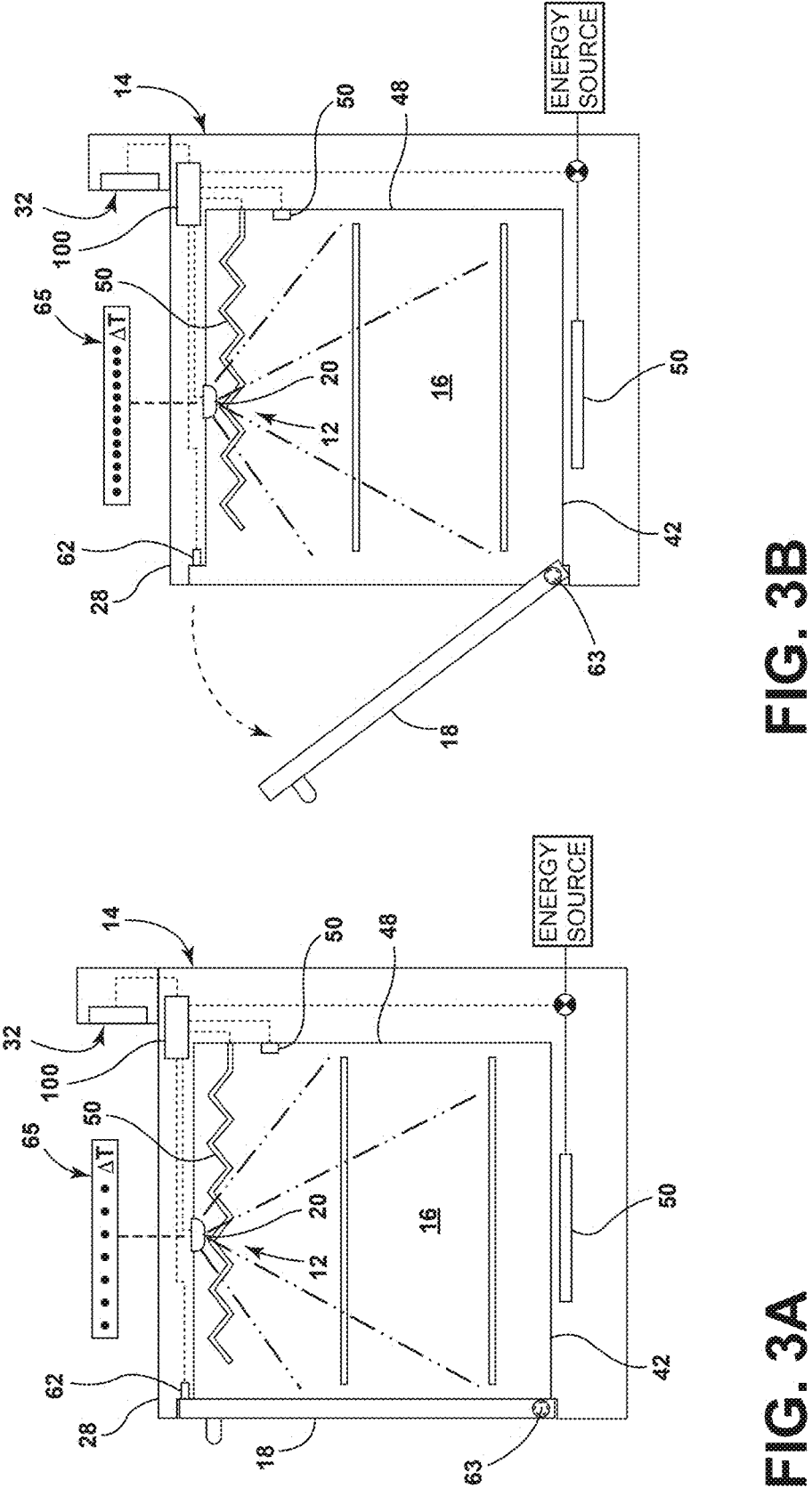
FIG. 3A is a partially schematic side view of a cooking appliance with a monitoring system and an adaptive frame rate and a door in a closed position, according to an aspect of the present disclosure.
FIG. 3B is a partially schematic side view of a cooking appliance with a monitoring system and an adaptive frame rate and a door in an open position, according to an aspect of the present disclosure.

With reference now to FIGS. 3A and 3B, the presence of the condition may include the position of the door 18. More particularly, the control system 100 (e.g., the processor 104) may further be configured to increase the frame rate (i.e., increase the fps) when the door 18 is in the open position and decrease the frame rate (i.e., decrease the fps) when the door 18 is in the closed position. The door 18 may connect to the body 14 via a hinge mechanism 63. In this manner, the user perception of low latency is provided by the increased frame rate when the door 18 is in the open position and/or move their hand in front of the camera module 20. The position of the door 18 may be detected by detections from the one or more sensors 62 and/or reviewing the images 22 received by the camera module 20. Reference numeral 65 generally designates the frame rate over a change in time or "ΔT." In some embodiments, the frame rate when the condition is present is 20 fps or more, for example, 25 fps or more, 30 fps or more, 35 fps or more, 40 fps or more, 45 fps or more, 50 fps or more, 55 fps or more, or 60 fps or more. In some embodiments, on the other hand, the frame rate when the condition is not present may be 20 fps or less, for example, 15 fps or less, 10 fps or less, 5 fps or less, 1 fps or less, or 0.1 fps or less.

With continued reference to FIGS. 3A and 3B, the condition of the cooking appliance 10 may include conditions unrelated to the position of the door 18. For example, the presence of the condition may include at least one of turning on the light module 58, a change of a temperature within the cooking chamber 16, or a duty cycle completion (e.g., when a timer is set to go off or a completion of a preprogrammed cooking cycle). In such scenarios, it may be beneficial to provide the user with the higher frame rate (e.g., on the display 26). The display 26 may be part of the user interface 32 and/or a device 66 remote from the cooking appliance 10. For example, the device 66 may be a mobile phone, a laptop, a tablet, a computing device, and/or the like. The cooking appliance 10 may therefore utilize the communication module 38 to transmit the captured images 22 to a display 26. In some embodiments, the communication module 38 may transmit the captured images 22 directly to the device 66 with one or more of a wireless internet, a cellular internet, or short-range transmission (e.g., Bluetooth). In some embodiments, the communication module 38 may transmit the captured images 22 to an intermediary server 70 (e.g., cloud) that transmits the captured images 22 to the device 66 with one or more of the wireless internet or the cellular internet. The captured images 22 on the display 26 may be sequenced in accordance with the frame rate to provide video streaming at the currently implemented fps.

Figure 4:
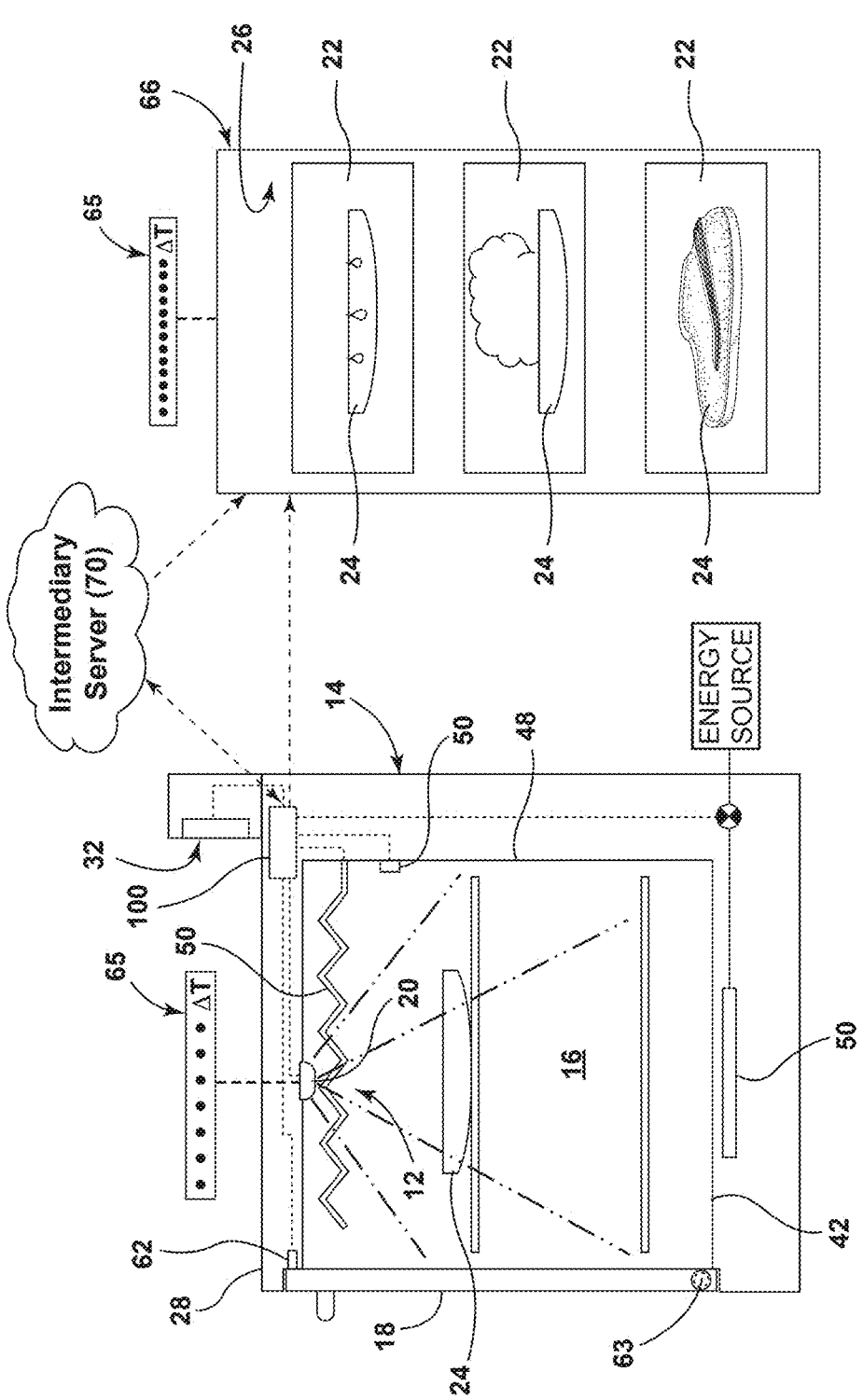
FIG. 4 is a partially schematic side view of a cooking appliance with a monitoring system and an adaptive frame rate and a foodstuff located within a cooking chamber, according to an aspect of the present disclosure.

With reference now to FIG. 4, the presence of the condition may include a change in the foodstuff 24 within the cooking chamber 16 where having an increased frame rate is beneficial. For example, the change in the foodstuff 24 may include at least one of boiling, browning, the generation of smoke, and/or the like. More particularly, if the foodstuff 24 is boiling, it may be beneficial to utilize the higher frame rate or up-to-date images 22 to prevent overboil scenarios. Likewise, if the foodstuff 24 is browning (e.g., nearing completion of a cooking cycle or doneness) it may be beneficial to utilize the higher frame rate or up-to-date images 22 to prevent overcooking/browning scenarios. In a similar manner, if the foodstuff 24 or other sources begin to generate smoke, it may be beneficial to utilize the higher frame rate or up-to-date images 22 to quickly and efficiently notify the user to take corrective action with the cooking appliance 10.

The cooking appliance 10 may therefore transmit (e.g., via the remote communication module 38) the captured images 22 to the display 26 based on the presence of the condition of the foodstuff 24. In some embodiments, the remote communication module 38 may transmit the captured images 22 directly to the device 66 with one or more of a wireless internet, a cellular internet, or short-range transmission (e.g., Bluetooth). In some embodiments, the remote communication module 38 may transmit the captured images 22 to an intermediary server 70 (e.g., cloud) that transmits the captured images 22 to the device 66 with one or more of the wireless internet or the cellular internet. The captured images 22 on the display 26 may be sequenced in accordance with the frame rate to provide video streaming at the currently implemented fps. Similar to the condition of the cooking appliance 10, the frame rate may be increased upon the presence of the condition of the foodstuff 24. More particularly, the reference numeral 65 again generally designates the frame rate over a change in time or "ΔT." In some embodiments, the frame rate when the condition of the foodstuff 24 is present is 20 fps or more, for example, 25 fps or more, 30 fps or more, 35 fps or more, 40 fps or more, 45 fps or more, 50 fps or more, 55 fps or more, or 60 fps or more. In some embodiments, on the other hand, the frame rate when the condition of the foodstuff 24 is not present may be 20 fps or less, for example, 15 fps or less, 10 fps or less, 5 fps or less, 1 fps or less, or 0.1 fps or less. The control system 100 (e.g., the processor 104) may be configured to determine the presence of the condition of the foodstuff 24 by reviewing the images 22 received by the camera module 20.

Figure 5:
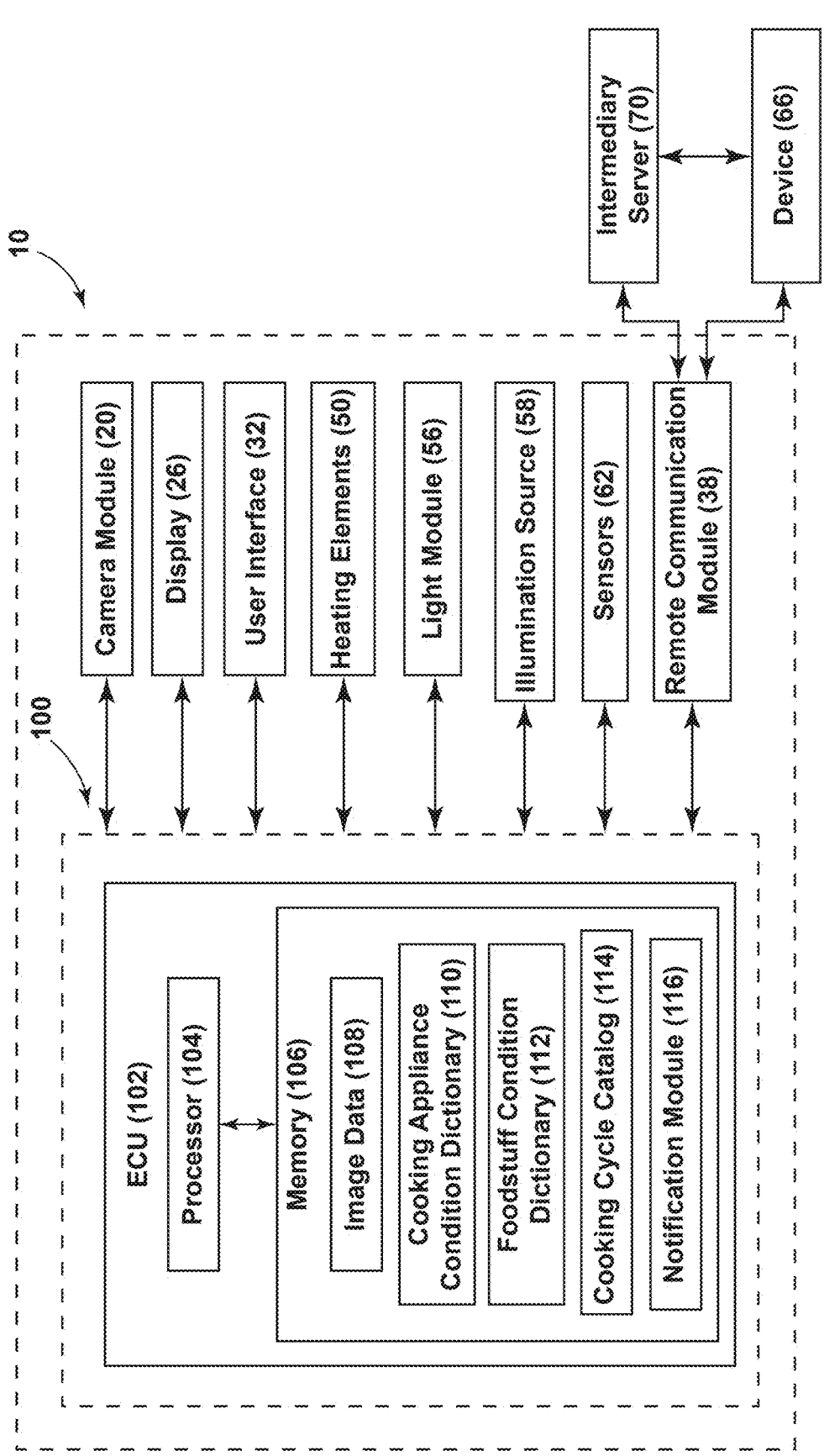
FIG. 5 is a schematic control system for a cooking appliance with a monitoring system, according to an aspect of the present disclosure.

With reference now to FIG. 5, the control system 100 is schematically illustrated. The control system 100 may include an electronic control unit (ECU) 102. The ECU 102 may include the processor 104 and a memory 106. The processor 104 may include any suitable processor 104. Additionally, or alternatively, the ECU 102 may include any suitable number of processors, in addition to or other than the processor 104. The memory 106 may comprise a single disk or a plurality of disks (e.g., hard drives) and includes a storage management module that manages one or more partitions within the memory 106. In some embodiments, memory 106 may include flash memory, semiconductor (solid-state) memory, other non-transitory storage mediums, or the like. The memory 106 may include Random Access Memory (RAM), a Read-Only Memory (ROM), Electrically Erasable Programmable Read-Only Memory (EEPROM), or a combination thereof. The memory 106 may include instructions that, when executed by the processor 104, cause the processor 104 to, at least, perform the functions associated with the components of the control system 100. The camera module 20, the display 26, the remote communication module 38, the illumination source 56, the light module 58, the one or more sensors 62, the user interface 32, and the heating element 50 may therefore be controlled by and/or receive instructions from the ECU 102. The memory 106 may therefore include image data 108, a cooking appliance condition dictionary 110, a foodstuff condition dictionary 112, a cooking cycle catalog 114, and a notification module 116.

The image data 108 may include the captured images 22. The captured images 22 may be stored temporarily for a period of time (e.g., one minute or less, two minutes or less, five minutes or less) or provisionally before being transmitted to the device 66 and/or intermediary server 70. The cooking appliance condition dictionary 110 may include instructions on what conditions of the cooking appliance 10, if present, correspond to generating an instruction to the camera module 20 to modify (e.g., increase) the frame rate. For example, the cooking appliance condition dictionary 110 may include instructions related to the presence of the position of the door 18, turning on the light module 58, a change of a temperature within the cooking chamber 16, a duty cycle completion (e.g., when a timer is set to go off or a completion of a preprogrammed cooking cycle), and/or the like. The foodstuff condition dictionary 112 may include instructions on what conditions of the foodstuff 24, if present, correspond to generating an instruction to the camera module 20 to modify (e.g., increase) the frame rate. For example, the foodstuff condition dictionary 112 may include instructions related to the presence of boiling, browning, the generation of smoke, and/or the like. The cooking cycle catalog 114 may include instructions for preprogrammed cooking cycles and/or may otherwise receive information from the user interface 32 (e.g., the timer). In this manner, the cooking cycle catalog 114 may be used in conjunction with the appliance condition dictionary 110 to determine certain conditions of the cooking appliance 10 related to duty cycle. The notification module 116 may include instructions on parameters on when the control system 100 (e.g., the processor 104) generates the captured images 22 on the display 26 (e.g., directly to the device 66 and/or through the intermediary server 70). In some embodiments, the notification module 116 may include instructions to (e.g., in addition to increasing the frame rate) alert the user for certain conditions, such as the presence of smoke, boiling, overbrowning of the foodstuff, the completion of a duty cycle, and/or the like. The parameters may include several independent conditions on when to generate the alert and the alert may be different based on the independent condition detected. The alert may be transmitted to the device 66 and include one or both of a visual and audible generation.

Figure 6:
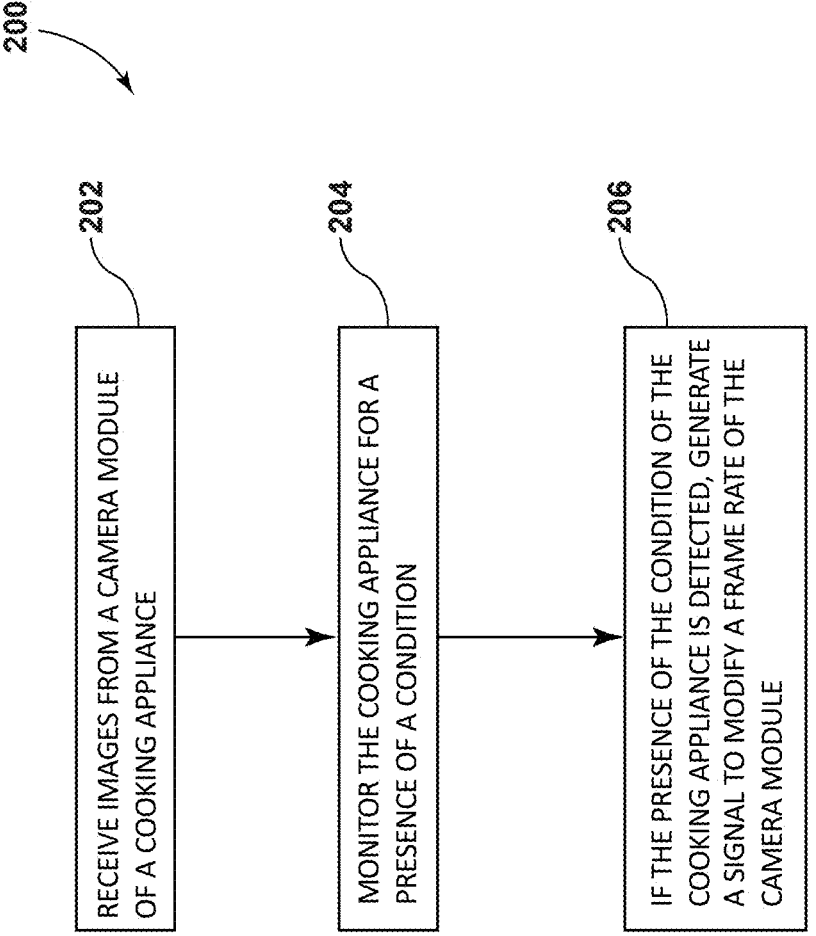
FIG. 6 illustrates a first method of monitoring a cooking appliance for the presence of a condition and modifying a frame rate based on the condition, according to an aspect of the present disclosure.

With reference now to FIG. 6, a method 200 of monitoring a cooking appliance for the presence of a condition of a cooking appliance is illustrated. In some embodiments, the first method 200 may be carried out by, for example, the cooking appliance 10 and control system 100 depicted in FIGS. 1-5. The first method 200 includes, at step 202, receiving images from a camera module. At step 204, the method 200 may include monitoring the cooking appliance for a presence of a condition. At step 206, the method 200 may include, if the presence of the condition of the cooking appliance is detected, generating a signal to modify a frame rate of the camera module (e.g., the captured images). For example, the frame rate may be increased in the presence of a position of a door, turning on a light module, a change of a temperature within a cooking chamber, a duty cycle completion (e.g., when a timer is set to go off or a completion of a preprogrammed cooking cycle), and/or the like.

Figure 7:
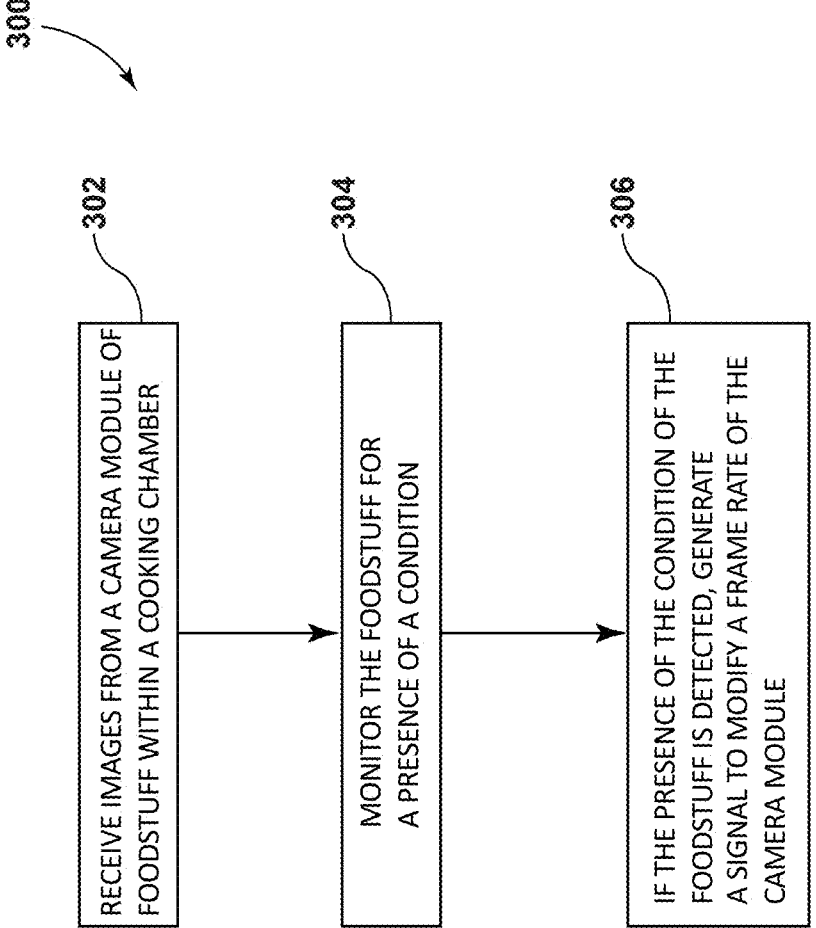
FIG. 7 illustrates a first method of monitoring a cooking chamber for the presence of a condition of an item of food and modifying a frame rate based on the condition, according to an aspect of the present disclosure.

With reference now to FIG. 7, a method 300 of monitoring foodstuff in a cooking chamber for the presence of a condition of the foodstuff is illustrated. In some embodiments, the second method 300 may be carried out by, for example, the cooking appliance 10 and control system 100 depicted in FIGS. 1-5. The second method 300 includes, at step 302, receiving images from a camera module. At step 304, the method 300 may include monitoring the foodstuff for a presence of a condition. At step 306, the method 300 may include, if the presence of the condition of the foodstuff is detected, generate a signal to modify a frame rate of the camera module (e.g., the captured images). For example, the frame rate may be increased in the presence of boiling, browning, the generation of smoke, and/or the like.

The disclosure herein is further summarized in the following paragraphs and is further characterized by combinations of any and all of the various aspects described therein.

According to one aspect of the present disclosure, a cooking appliance includes a body defining a cooking chamber and a door moveable between a closed position and an open position. A camera module is configured to capture images of the cooking chamber. A control system is configured to receive the images from the camera module, monitor the cooking appliance or a foodstuff within the cooking chamber for a presence of a condition, and, if the presence of the condition is detected, generate a signal to modify a frame rate of the camera module.

According to another aspect, a control system is configured to monitor a cooking appliance for the presence of a condition by reviewing images received by a camera module. According to yet another aspect, a sensor is configured to detect the presence of a condition, and a control system is configured to monitor a cooking appliance for the presence of the condition by receiving the detection from the sensor.

According to still yet another aspect, the presence of a condition includes the position of the door.

According to another aspect, a control system is configured to increase a frame rate when a door is in an open position and decrease the frame rate when the door is in a closed position.

According to yet another aspect, a sensor configured to detect a position of a door of a cooking appliance.

According to still yet another aspect, a control system is configured to determine a position of a door of a cooking appliance by reviewing the images received by a camera module.

According to another aspect, the presence of a condition includes at least one of turning on a light module that is configured to light a cooking chamber, a change of a temperature within the cooking chamber, or a duty cycle completion.

According to yet another aspect, the presence of a condition includes a change in a foodstuff within a cooking chamber.

According to still yet another aspect, the change in the foodstuff includes at least one of boiling, browning, or the generation of smoke.

According to another aspect, a control system is configured to increase a frame rate if the presence of a condition is detected.

According to yet another aspect, a control system is configured to determine the presence of a condition by reviewing the images received by a camera module.

According to still yet another aspect, an illumination source is configured to illuminate a cooking chamber within the infrared spectrum.

According to another aspect of the present disclosure, a cooking appliance includes a body defining a cooking chamber and a door moveable between a closed position and an open position. A camera module is configured to capture images of the cooking chamber. A control system is configured to receive the images from the camera module, monitor the cooking appliance for a presence of a condition, and, if the presence of the condition is detected, generate a signal to modify a frame rate of the camera module.

According to another aspect, the presence of a condition includes the position of the door.

According to yet another aspect, a control system is configured to increase a frame rate when a door is in an open position and decrease the frame rate when the door is in a closed position.

According to yet another aspect, a communication module is configured to transmit the captured images to a display.

According to another aspect, the display is remote from the cooking appliance.

According to yet another aspect of the present disclosure, a cooking appliance includes a body defining a cooking chamber and a door moveable between a closed position and an open position. A camera module is configured to capture images of the cooking chamber. A control system is configured to receive the images from the camera module, monitor a foodstuff within the cooking chamber for a presence of a condition, and, if the presence of the condition is detected, generate a signal to modify a frame rate of the camera module.

According to another aspect, a communication module is configured to transmit the captured images to a display.

It will be understood by one having ordinary skill in the art that construction of the described disclosure and other components is not limited to any specific material. Other exemplary embodiments of the disclosure disclosed herein may be formed from a wide variety of materials, unless described otherwise herein.

For purposes of this disclosure, the term "coupled" (in all of its forms, couple, coupling, coupled, etc.) generally means the joining of two components (electrical or mechanical) directly or indirectly to one another. Such joining may be stationary in nature or movable in nature.

Such joining may be achieved with the two components (electrical or mechanical) and any additional intermediate members being integrally formed as a single unitary body with one another or with the two components. Such joining may be permanent in nature or may be removable or releasable in nature unless otherwise stated.

As used herein, the term "about" means that amounts, sizes, formulations, parameters, and other quantities and characteristics are not and need not be exact, but may be approximate and/or larger or smaller, as desired, reflecting tolerances, conversion factors, rounding off, measurement error and the like, and other factors known to those of skill in the art. When the term "about" is used in describing a value or an end-point of a range, the disclosure should be understood to include the specific value or end-point referred to. Whether or not a numerical value or end-point of a range in the specification recites "about," the numerical value or end-point of a range is intended to include two embodiments: one modified by "about," and one not modified by "about." It will be further understood that the end-points of each of the ranges are significant both in relation to the other end-point, and independently of the other end-point.

The terms "substantial," "substantially," and variations thereof as used herein are intended to note that a described feature is equal or approximately equal to a value or description. For example, a "substantially planar" surface is intended to denote a surface that is planar or approximately planar. Moreover, "substantially" is intended to denote that two values are equal or approximately equal. In some embodiments, "substantially" may denote values within about 10% of each other, such as within about 5% of each other, or within about 2% of each other.

It is also important to note that the construction and arrangement of the elements of the disclosure as shown in the exemplary embodiments is illustrative only. Although only a few embodiments of the present innovations have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited. For example, elements shown as integrally formed may be constructed of multiple parts or elements shown as multiple parts may be integrally formed, the operation of the interfaces may be reversed or otherwise varied, the length or width of the structures and/or members or connectors or other elements of the system may be varied, and the nature or number of adjustment positions provided between the elements may be varied. It should be noted that the elements and/or assemblies of the system may be constructed from any of a wide variety of materials that provide sufficient strength or durability, in any of a wide variety of colors, textures, and combinations. Accordingly, all such modifications are intended to be included within the scope of the present innovations. Other substitutions, modifications, changes, and omissions may be made in the design, operating conditions, and arrangement of the desired and other exemplary embodiments without departing from the spirit of the present innovations.

It will be understood that any described processes or steps within described processes may be combined with other disclosed processes or steps to form structures within the scope of the present disclosure. The exemplary structures and processes disclosed herein are for illustrative purposes and are not to be construed as limiting.

What is claimed is:

1. A cooking appliance, comprising:
   a body defining a cooking chamber;
   a door moveable between a closed position and an open position;
   a camera module configured to capture images of the cooking chamber at a plurality of frame rates; and
   a control system configured to:
      receive the images from the camera module;
      monitor changes of the cooking appliance or a foodstuff within the cooking chamber for a presence of a condition associated with increasing or decreasing the frame rate of the camera, wherein the presence of the condition includes a position of the door; and
      based on the position of the door, generate a signal to increase the frame rate of the camera module when the door is in the open position and decrease the frame rate of the camera when the door is in the closed position.

2. The cooking appliance according to claim 1, wherein the control system is configured to monitor the cooking appliance for the position of the door by reviewing the images received by the camera module.

3. The cooking appliance according to claim 1, further including a sensor configured to detect the presence of the condition, and wherein the control system is configured to monitor the cooking appliance for the position of the door by receiving the detection from the sensor.

4. The cooking appliance according to claim 1, further including a communication module that wirelessly transmits the captured images to a display remote from the cooking appliance.

5. The cooking appliance according to claim 1, further including a sensor configured to detect the position of the door, the sensor including a switch that is actuated based on movement of the door.

6. The cooking appliance according to claim 1, further including a magnetic sensor configured to detect the position of the door.

7. The cooking appliance according to claim 1, wherein the presence of the condition associated with increasing or decreasing the frame rate of the camera further includes at least one of turning on a light module that is configured to light the cooking chamber, a change of a temperature within the cooking chamber, or a duty cycle completion.

8. The cooking appliance according to claim 1, wherein the presence of the condition associated with increasing or decreasing the frame rate of the camera further includes a change in the foodstuff within the cooking chamber.

9. The cooking appliance according to claim 8, wherein the change in the foodstuff includes at least one of boiling, browning, or the generation of smoke.

10. The cooking appliance according to claim 9, wherein the control system is configured to increase the frame rate if the change in foodstuff is detected.

11. The cooking appliance according to claim 9, wherein the control system is configured to determine the change in foodstuff by reviewing the images received by the camera module.

12. The cooking appliance according to claim 1, further including an illumination source configured to illuminate the cooking chamber within the infrared spectrum.

13. A cooking appliance, comprising:

a body defining a cooking chamber;

a door moveable between a closed position and an open position;

a camera module configured to capture images of the cooking chamber at a plurality of frame rates; and a control system configured to:

receive the images from the camera module;

monitor changes of the cooking appliance for a presence of a condition associated with increasing or decreasing the frame rate of the camera that includes at least one of a change of a temperature within the cooking chamber or a duty cycle completion; and if the presence of the condition is detected, generate a signal to increase or decrease the frame rate of the camera module.

14. The cooking appliance according to claim 13, wherein the control system is further configured to increase the frame rate when the duty cycle is completed.

15. The cooking appliance according to claim 13, further including a communication module that transmits the captured images to a display.

16. The cooking appliance according to claim 15, wherein the display is remote from the cooking appliance.

17. A cooking appliance, comprising:

a body defining a cooking chamber;

a door moveable between a closed position and an open position;

a camera module configured to capture images of the cooking chamber at a plurality of frame rates; and a control system configured to:

receive the images from the camera module;

monitor changes of the cooking appliance for a presence of a condition associated with increasing or decreasing the frame rate of the camera, wherein the presence of the condition associated with increasing or decreasing the frame rate of the camera includes at least one of turning on a light module that is configured to light the cooking chamber, a change of a temperature within the cooking chamber, or a duty cycle completion; and if the presence of the condition is detected, generate a signal to increase or decrease the frame rate of the camera module.

18. The cooking appliance according to claim 17, wherein the control system is configured to monitor a foodstuff within the cooking chamber for the presence of the condition associated with increasing or decreasing the frame rate of the camera, and the control system is configured to increase the frame rate if the presence of the condition of the foodstuff includes at least one of boiling, browning, or the generation of smoke from the foodstuff.

* * * * *